(12) United States Patent
Tu (10) Patent No.: US 9,481,491 B1
(45) Date of Patent: Nov. 1, 2016

(54) CONTAINING DEVICE

(71) Applicant: Tse-Ju Tu, Taoyuan (TW)

(72) Inventor: Tse-Ju Tu, Taoyuan (TW)

( * ) Notice: Subject to any disclaimer, the term of this patent is extended or adjusted under 35 U.S.C. 154(b) by 0 days.

(21) Appl. No.: 14/712,037

(22) Filed: May 14, 2015

(51) Int. Cl.
B65D 25/20 (2006.01)
B65D 83/00 (2006.01)

(52) U.S. Cl.
CPC .............. *B65D 25/20* (2013.01); *B65D 83/00* (2013.01)

(58) Field of Classification Search
CPC ................................ B65D 25/20; B65D 83/00
USPC ......... 220/23.83, 694, 737, 740, 741, 23.86, 220/23.89, 23.87, 23.9, 703
See application file for complete search history.

(56) References Cited

U.S. PATENT DOCUMENTS

| | | | | |
|---|---|---|---|---|
| 3,189,229 | A * | 6/1965 | Carroll | A47G 19/12 215/12.1 |
| 3,191,794 | A * | 6/1965 | Perkins | B01L 7/04 220/560.12 |
| 4,618,066 | A * | 10/1986 | Vail | A47J 41/00 206/217 |
| 5,398,842 | A * | 3/1995 | Sokolski | A47G 19/2272 220/367.1 |
| 5,515,995 | A * | 5/1996 | Allen | A47G 19/2261 215/13.1 |
| 6,386,431 | B1 * | 5/2002 | Lin | A47J 41/028 220/23.83 |

* cited by examiner

*Primary Examiner* — Robert J Hicks
*Assistant Examiner* — Kareen Thomas
(74) *Attorney, Agent, or Firm* — Rosenberg, Klein & Lee (57) ABSTRACT

A containing device includes a first container, a second container and a lid. The first container is provided for containing a powder or particulate substance and includes a first leading-out opening and a second leading-out opening. The lid is combined to an upper end or a lower end of the first container upper end or lower end for sealing and resisting moisture of the content of the first container. The second container is movably pivoted in the first container and includes a fixed number of receiving grooves, and the receiving groove has a leading-in opening, a release outlet and a separating board. When the leading-in opening of the second container is displaced to a position corresponsive to the first leading-out opening of the first container, the release outlet is sealed, so that a fixed quantity of content of the first container enters into the second container. When the release outlet is displaced to a position corresponsive to the second leading-out opening of the first container, the first leading-out opening of the first container is sealed by the separating board, so that a fixed quantity of the content of the second container is discharged smoothly to provide a simple, easy, convenient and quick application.

9 Claims, 10 Drawing Sheets

CONTAINING DEVICE

FIELD OF THE INVENTION

The present invention relates to a containing device, and more particularly to the containing device with the feature of simple, easy and convenient installation, operation and application and capable of repacking or mixing a variety of powder or particulate substances, so that a fixed quantity of the repacked or mixed contents can be discharged easily, smoothly and quickly to achieve the expected using effect of the powder or particulate substances.

BACKGROUND OF THE INVENTION

Various types of brewing nutritional supplements, Chinese medicines, cooking condiments, and many other materials are made in form of powder or particles to facilitate eating, drinking, using, or even being absorbed by human bodies. The consumption of the powder or particulate substances generally has some common features such as a fixed quantity of consumption or a mixture of several substances of similar properties mixed in a certain proportion. Therefore, a spoon or a measuring tool of a fixed unit or quantity is generally attached to a packaging object such as a bag, a bottle or a can for containing the powder or particulate substances, so as to provide a convenient and accurate application and achieve a better effect.

However, the aforementioned the powder or particulate substances have the issue of being moistened by water or moisture. Particularly the original containing device such as a bag, a bottle or a can comes with a relatively large size, so that after users opens, shuts and uses the containing device for some time, the powder or particulate substances may be agglomerated or even deteriorated by moisture. In addition, the relatively large original packing containing device occupies more space and causes inconvenience of portability or use while the user is going out.

To improve the inconvenience of portability, some consumers buy a smaller containing device which is used for packing or mixing the contents of the original packing containing device, but a spoon or a measuring tool with a fixed unit or quantity is still required for the application, and the containing device is still opened, shut and operated by the users. The users have to measure the packed or mixed contents repeatedly one by one, and such application is troublesome and inconvenient to users, particularly to the elderly and children. The conventional containing device has the drawbacks of causing inconvenience of use, making a user to take measurements at will, reducing the willingness of use, and lowering the efficiency of use.

SUMMARY OF THE INVENTION

It is a primary objective of the present invention to overcome the aforementioned drawbacks of the conventional containing device by providing a containing device capable of repacking or mixing a variety of powder or particulate substances and achieving the convenient portability and anti-moisture storage effect, so that a fixed quantity of the repacked or mixed contents can be discharged easily, smoothly and quickly to achieve the expected using effect of the powder or particulate substances.

To achieve the aforementioned objective, the present invention provides a containing device comprising a first container, a second container and a lid. The first container is provided for containing a powder or particulate substance and includes a first leading-out opening and a second leading-out opening, and the lid is combined with an upper end or a lower end of the first container for sealing and resisting moisture of the content of the first container, and the second container is movably pivoted in the first container and includes a fixed number of receiving grooves, and the receiving groove has a leading-in opening, a release outlet and a separating board. When the leading-in opening of the second container is displaced to a position corresponsive to the first leading-out opening of the first container, the release outlet is sealed, so that a fixed quantity of the content of the first container enters into the second container. When the release outlet is displaced to a position corresponsive to the second leading-out opening of the first container, the first leading-out opening of the first container is sealed by the separating board, so that a fixed quantity of the content of the second container is discharged smoothly to provide a simple, easy, convenient and quick application.

DESCRIPTION OF THE PREFERRED EMBODIMENTS

The technical characteristics, contents, advantages and effects of the present invention will be apparent with the detailed description of a preferred embodiment accompanied with related drawings as follows.

With reference to FIGS. 1 to 5 for a containing device of the present invention, the containing device comprises a first container 10, a second container 20 and a lid 30.

The first container 10 is provided for containing a powder or particulate substance and includes a containing body 101 and a base 102. The containing body 101 includes a first containing portion 1011 for containing a powder or particulate substance, and an opening 1012 is formed at an upper end of the first containing portion 1011, and a first leading-out opening 1013 is formed at a lower end of the first containing portion 1011 and communicated with the base 102. The base 102 includes a second containing portion 1021, and a second leading-out opening 1022 formed at a lower end of the second containing portion 1021 and communicated with the outside. Wherein, the containing body 101 and the base 102 may be engaged or removed with respect to each other, and at least one tenon 1014 or mortise is disposed at a lower end of the containing body 101, and at least one mortise 1023 or tenon is disposed at an upper end of the base 102, and the mortise 1023 or tenon of the base 102 and the tenon 1014 or mortise of the containing body 101 are corresponsive to each other, and may be pivoted or separated with respect to each other.

Figure 3:
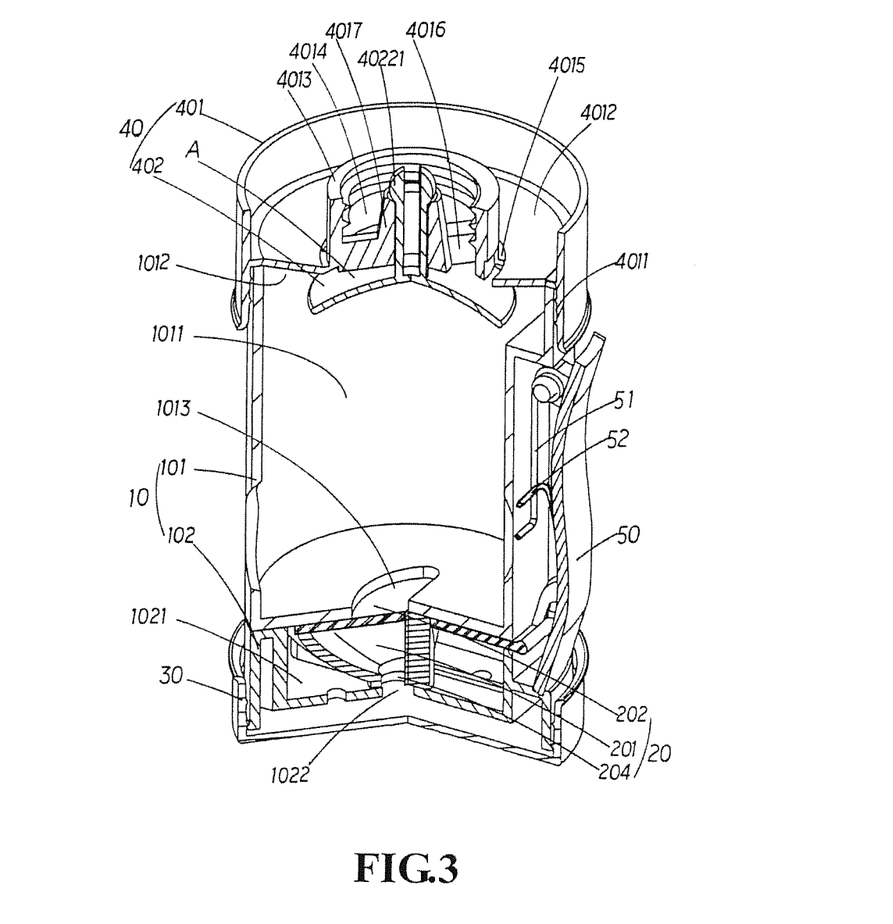
FIG. 3 is a sectional view of a second leading-out opening of a first container corresponsive to a release outlet of a second container as depicted in FIG. 1.
Figure 4:
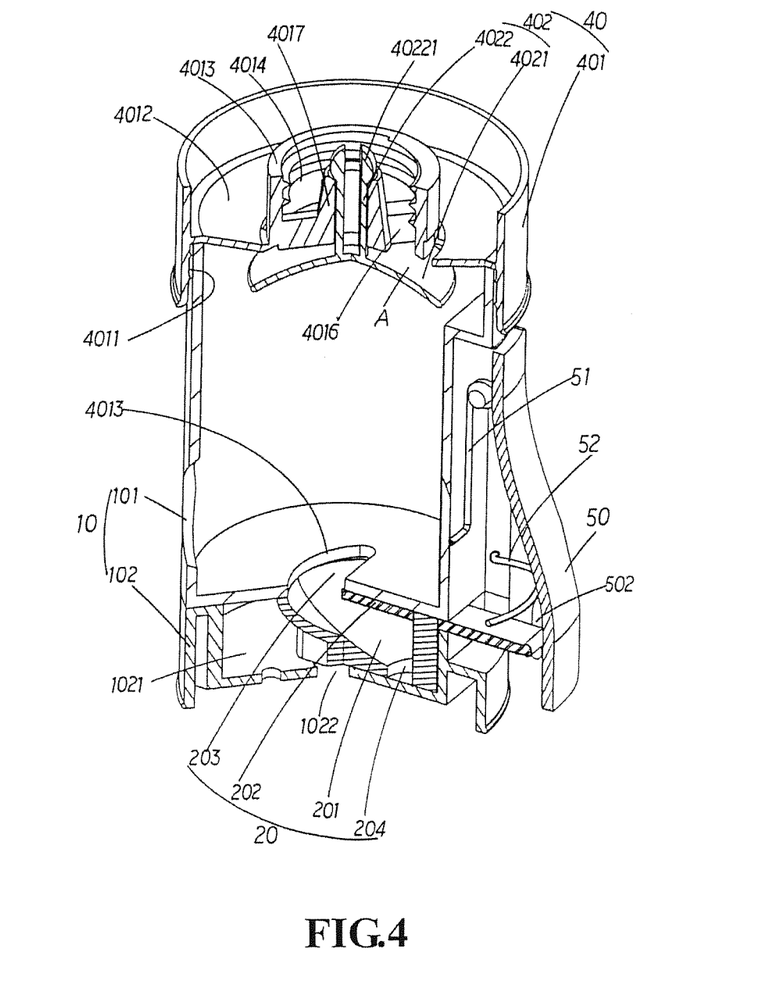
FIG. 4 is a section view of a release outlet of a second container as depicted in FIG. 1 being sealed.

The second container 20 is movably pivoted in the second containing portion 1021 of the base 102 of the first container 10 and capable of displacing and changing directions in the second containing portion 1021. The second container 20 has a fixed number of receiving grooves 201, and a separating board 202 formed at the top of the receiving groove 201 and having a leading-in opening 203 formed thereon, and a release outlet 204 formed at a lower end of the receiving groove 201 and communicated to the outside. When, the separating board 202 with the leading-in opening 203 is displaced in the second container 20 to a position corresponsive to the first leading-out opening 1013 of the containing body 101, and the release outlet 204 of the separating board 202 is corresponsive to the first leading-out opening 1013 of the first container 10, the release outlet 204 is aligned corresponsive to the second leading-out opening 1022 of the base 102 of the first container 10 (as shown in FIG. 3). On the contrary, when the leading-in opening 203 is corresponsive to the first leading-out opening 1013 of the first container 10, the release outlet 204 is sealed by the base 102 of the first container 10 (as shown in FIG. 4).

Figure 5:
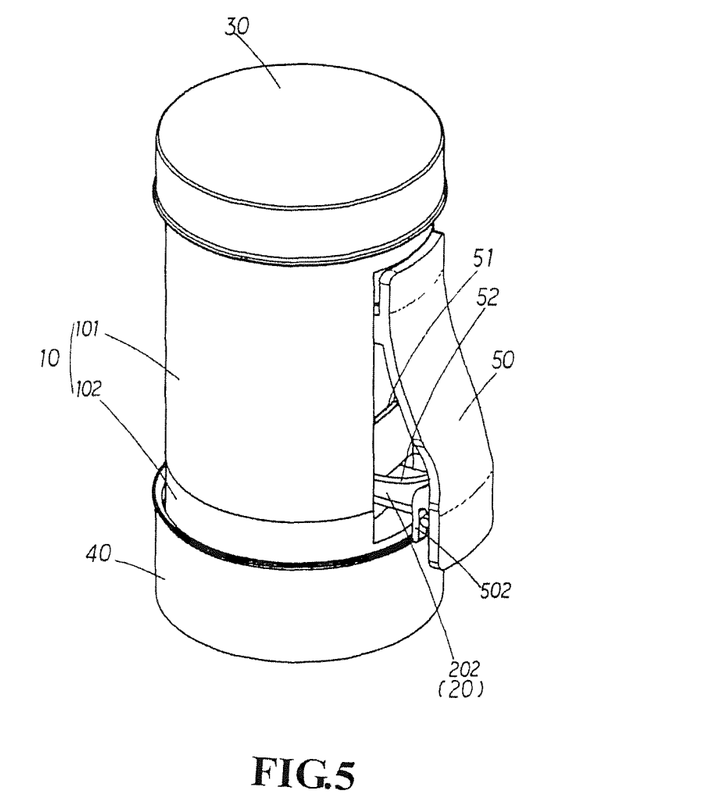
FIG. 5 is a perspective view of a second preferred embodiment of the present invention.

The lid 30 is installed at an upper end of the first container 10 (as shown in FIG. 5), or installed at a lower end of the first container 10 (as shown in FIG. 3), and provided for sealing and resisting moisture of the powder or particulate substance of the first container 10.

Figure 1:
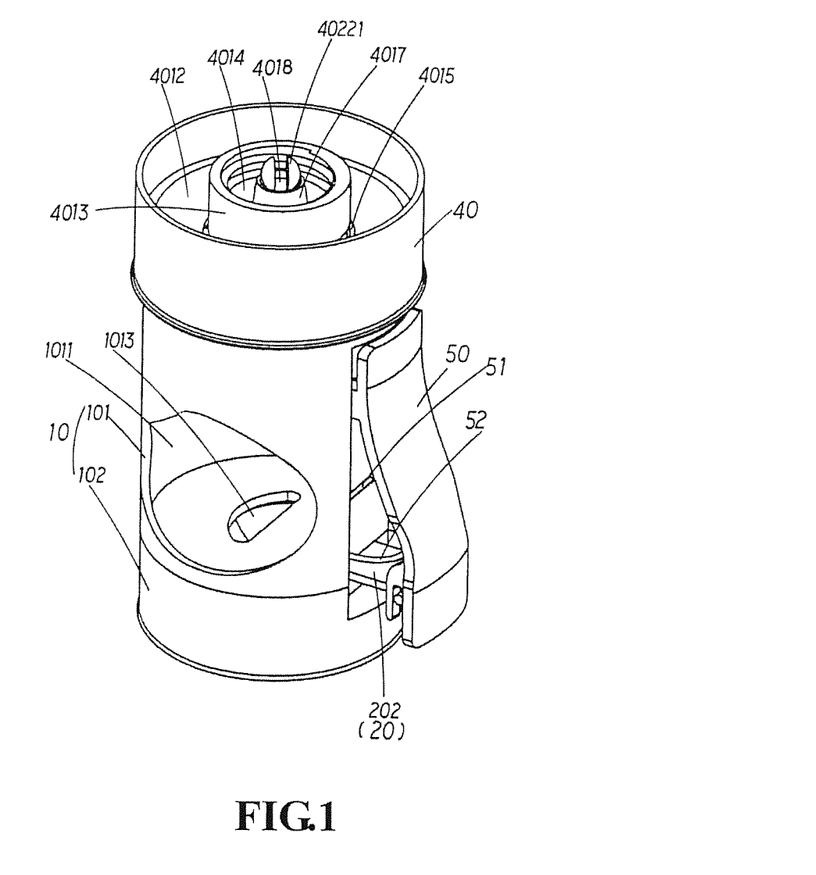
FIG. 1 is a perspective view of a first preferred embodiment of the present invention.
Figure 2:
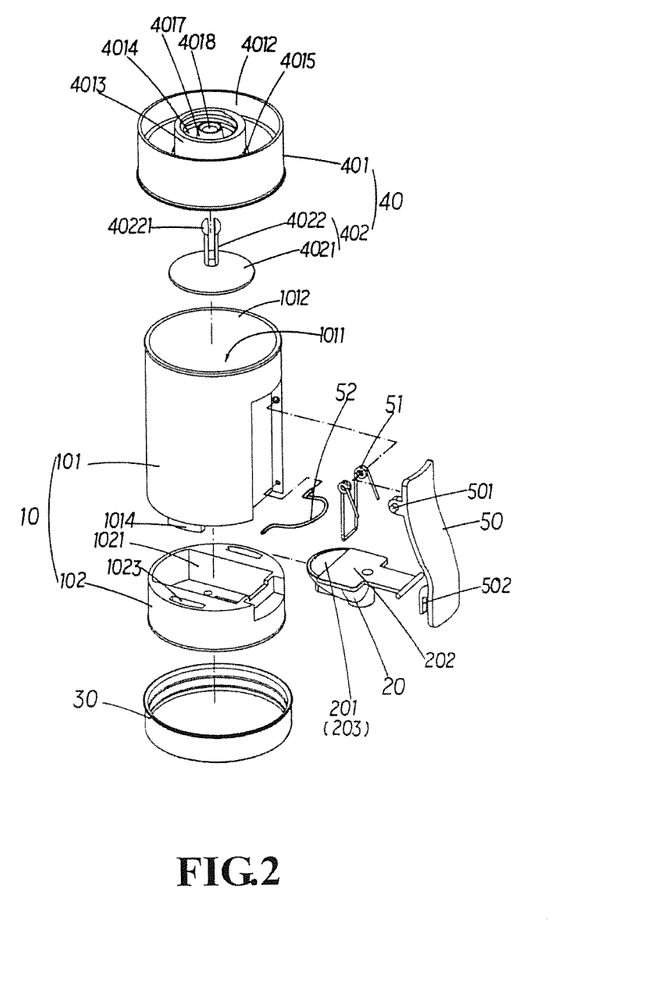
FIG. 2 is an exploded view of FIG. 1.
Figure 6:
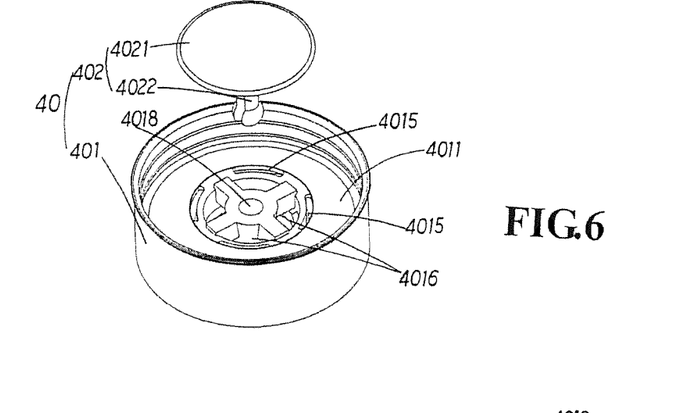
FIG. 6 is an exploded view of a second lid of the second preferred embodiment of the present invention.
Figure 7:
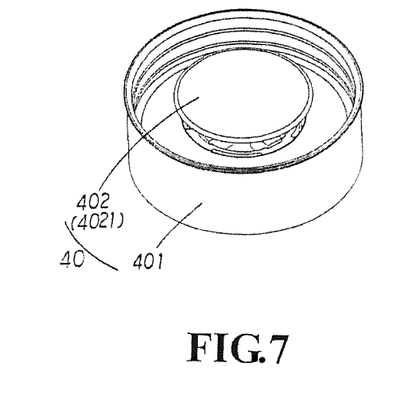
FIG. 7 is a perspective view of an assembly as depicted in FIG. 6.
Figure 8:
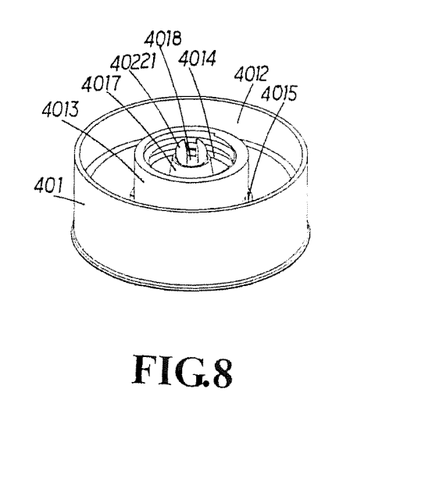
FIG. 8 is a perspective view of FIG. 7 viewing at another viewing angle.

In FIGS. 6 to 8, a second lid 40 may be installed at the upper end or the lower end of the first container 10, if needed. The second lid 40 includes a main body 401 and a blocking member 402, wherein the main body 401 includes a first sleeve portion 4011 and a second sleeve portion 4012, and the first sleeve portion 4011 is sheathed on the upper end of the first container 10 (as shown in FIGS. 1, 3 and 4) or the lower end of the first container 10 (as shown in FIG. 5), and the second sleeve portion 4012 is opened outwardly and has feed nozzle 4013 formed at and protruded from a center position of the second sleeve portion 4012, and the feed nozzle 4013 has a coupling hole 4014 concavely formed with an appropriate depth and provided for combining with an original packaging can or bottle or a repacked can or bottle of the powder or particulate substance, and guide holes 4015 are formed between the first sleeve portion 4011 and the second sleeve portion 4012 and communicated with each other, and guide holes 4016 are formed between the coupling hole 4014 of the feed nozzle 401 and the first sleeve portion 4011 and communicated with each other, and a tenon body 4017 is protruded outwardly from the coupling hole 4014 of the feed nozzle 4013, and an insert hole 4018 is formed and penetrated through the tenon body 4017. The blocking member 402 includes a blocking plate 4021 and a positioning pillar 4022, and the positioning pillar 4022 is movably installed and positioned at the insert hole 4018 of the main body 401, such that the blocking plate 4021 is situated at the first sleeve portion 4011 of the main body 401.

A ledge 40221 formed at an outer end of the positioning pillar 4022 is protruded from and positioned at an outer edge of the insert hole 4018 of the main body 401, such that a moving channel A is formed between the blocking plate 4021 and the bottom of the first sleeve portion 4011 of the main body 401, and the blocking plate 4021 is tilted, so that when the channel A is opened, it is upwardly tapered, and when the channel A is shut, the guide hole 4015 of the main body 401 and the feed guiding hole 4016 are sealed.

In addition, a handle 50 is coupled between the first container 10 and the second container 20, and a positioning tenon 501 is disposed at an end of the handle 50 and movably pivoted to the containing body 101 of the first container 10, and a pivot lug 502 is disposed at the other end of the handle 50 and movably pivoted to an outer end of the second container 20, and an elastic element 51 is coupled between the handle 50 and the first container 10 for maintaining the handle 50 to be outwardly extended all the time, and displacing the second container 20 altogether such that the leading-in opening 203 is aligned precisely with the first leading-out opening 1013 of the first container 10, and the release outlet 204 of the second container 20 is sealed by the base 102 of the first container 10 (as shown in FIG. 4). If the handle 50 is pressed inwardly, the second container 20 will be displaced altogether, such that the release outlet 204 is corresponsive to the second leading-out opening 1022 of the base 102 of the first container 10, and the separating board 202 seals the first leading-out opening 1013 of the first container 10. In addition, a moving blocker 52 is coupled between the first container 10 and the handle 50, and an end of the moving blacker 52 is movably pivoted to the containing body 101 of the first container 10 or the handle 50, and the other end of the moving blocker 52 may swing feely. When the moving blocker 52 is extended outwardly from the handle 50, a force may be applied to turn the moving blocker 51 to a horizontal position to block between the first container 10 and the handle 50 (as shown in FIG. 4) so as to stop the handle 50 from being pressed. If it is necessary to press the handle 50, a user simply applies a slight force to turn the moving blocker 52 to a position that will not block the handle 50 (as shown in FIGS. 3 and 11).

Figure 9:
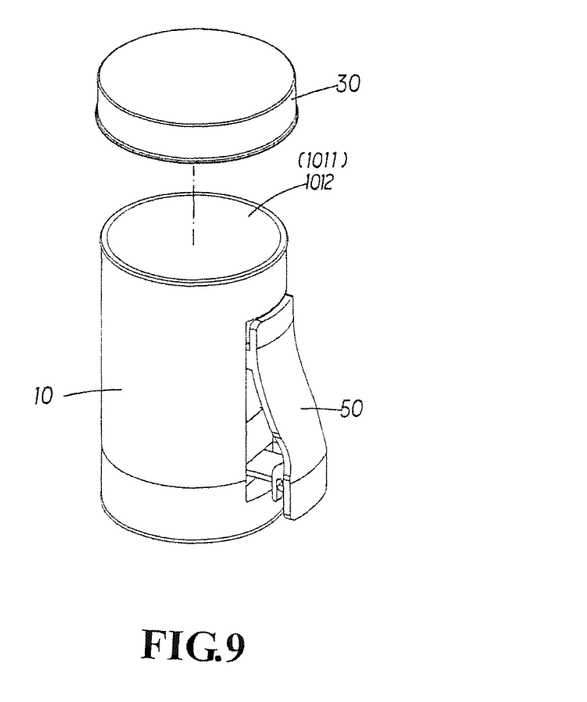
FIG. 9 is a perspective view of an embodiment of a lid disposed at an upper end of a first container in accordance with the present invention.
Figure 10:
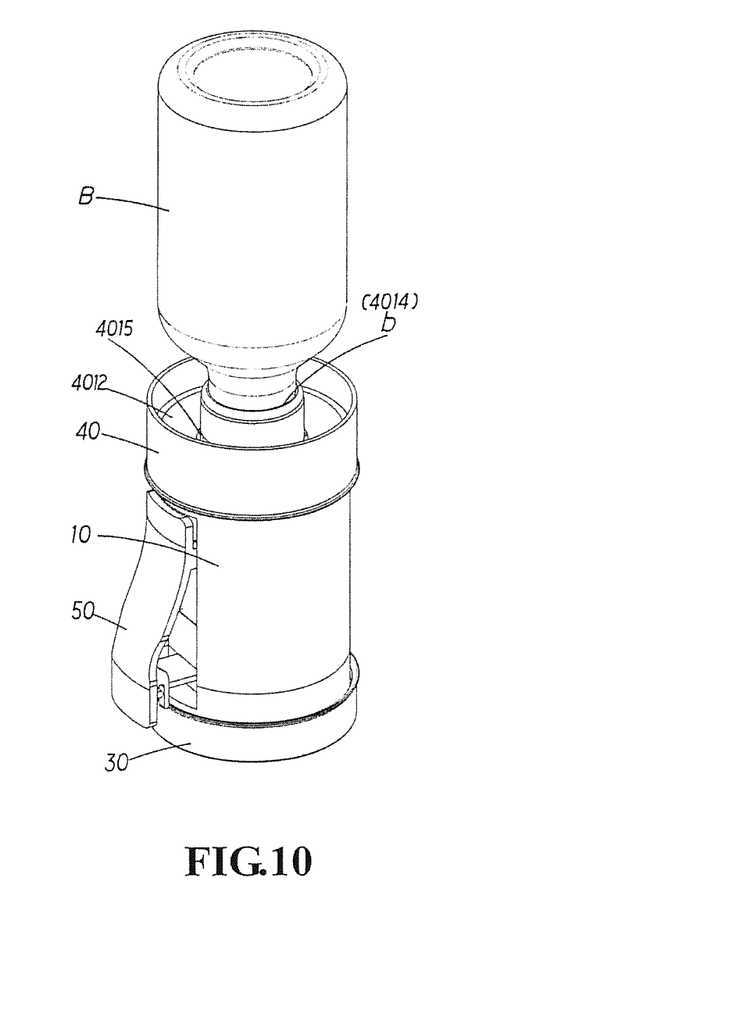
FIG. 10 is a perspective view of an embodiment of the present invention provided for packaging a bottle or a can.
Figure 11:
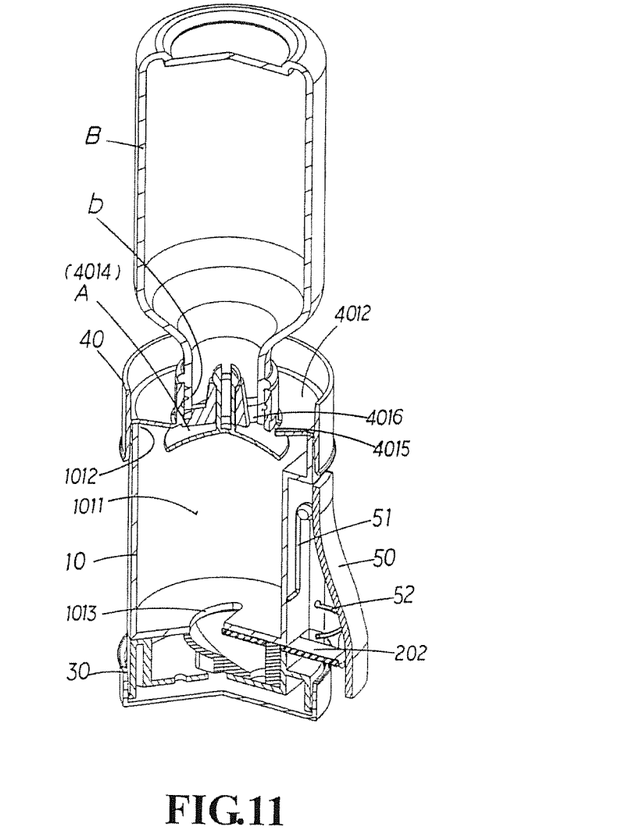
FIG. 11 is a sectional view of FIG. 10.
Figure 12:
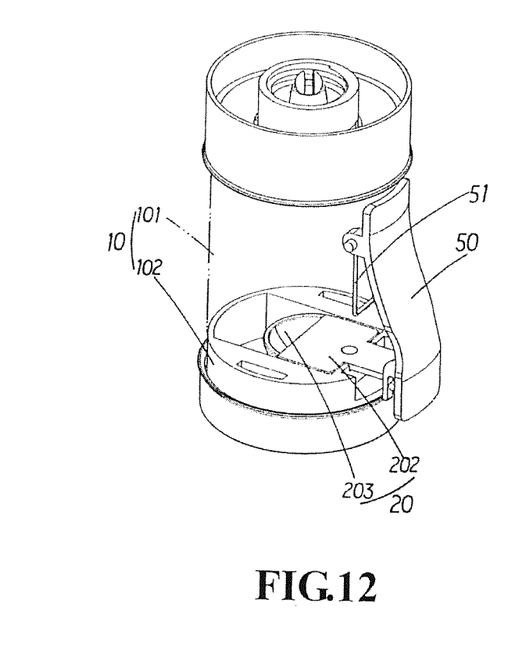
FIG. 12 is a perspective view of an embodiment of a handle being extended outwardly in accordance with the present invention.
Figure 13:
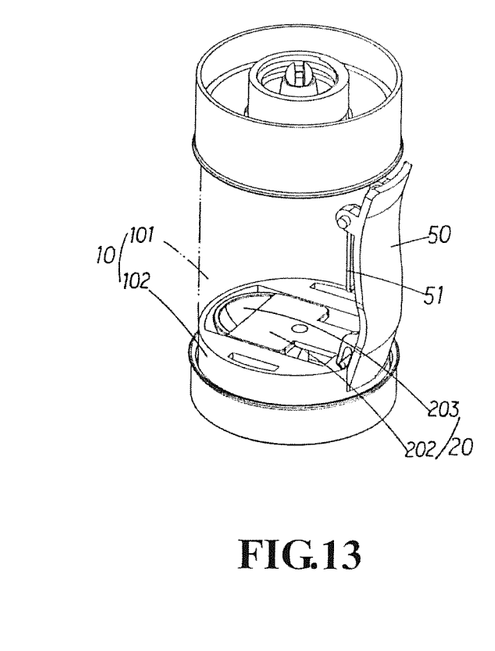
FIG. 13 is a perspective view of an embodiment of a handle being pressed inwardly in accordance with the present invention.

In the aforementioned structure of the present invention as shown in FIGS. 9 to 11, the first leading-out opening 1013 of the first container 10 is sealed by the separating board 202 of the second container 20 (as shown in FIG. 3), or the release outlet 204 of the second container 20 is sealed by the base 102 of the first container 10 (as shown in FIG. 4), so that different types of powder or particulate substances contained in a relatively larger packaging bottle, can or bag B may be repackaged from the upper end opening 1012 of the first container 10 into the first containing portion 1011 directly (as shown in FIG. 9), and then the lid 30 is covered onto the upper end of the first container 10 to achieve the sealing and moisture-proof effects, or different types of powder or particulate substances contained in a relatively larger packaging bottle, can or bag B may be repackaged into the first containing portion 1011 through the second lid 40 installed at the upper end opening 1012 of the first container 10 (as shown in FIGS. 1, 10 and 11). After a mouth b of the packaging bottle or can B is aligned and inserted precisely into the coupling hole 4014 of the second lid 40, the powder or particulate substance in the packaging bottle or can B may enter directly from the channel A of the feed guiding hole 4016 into the first containing portion 1011 of the first container 10, or the content of the packaging bottle, can or bag B may be poured directly into second sleeve portion 4012 and entered directly through the guide hole 4015 and the channel A into the first containing portion 1011 of the first container 10. After the repackaging process is completed, the second lid 40 is removed from the first container 10, and the lid 30 is installed instead to achieve the sealing and moisture-proof effects (as shown in FIG. 5). In FIGS. 12 and 13, the second container 20 is elastically operated by the handle 50, so that the leading-in opening 203 is corresponsive to the first leading-out opening 1013 of the first container 10 all the time (as shown in FIGS. 4 and 12), and the release outlet 204 is sealed by the base 102 of the first container 10 all the time. After different types of powder or particulate substances are repackaged or mixed from the original packaging bag, bottle, or can B into the containing body 101 of the first container 10, the powder or particulate substances will automatically drop into the receiving groove 201 through the first leading-out opening 1013 and the leading-in opening 203 of the second container 20. In the meantime, the release outlet 204 of the second container 20 is sealed to achieve the sealing and anti-leakage effects. When it is necessary to use the content contained in the first container 10, a user simply presses the handle 50, such that the second container 20 will be displaced altogether to the release outlet 204 and to a position corresponsive to the second leading-out opening 1022 of the base 102 of the first container 10 (as shown in FIG. 3). Naturally, the powder or particulate substance contained in the second container 20 can be discharged smoothly to the outside through the release outlet 204 and the second leading-out opening 1022. In the meantime, the separating board 202 of the second container 20 will be displaced to a position precisely seals the first leading-out opening 1013 of the first container 10 (as shown in FIGS. 3 and 13). When the content in the first container 10 drops into the second container 20 and the content in the second container 20 is not discharged, the receiving groove 201 of the second container 20 capable of controlling a fixed unit or quantity assure that a fixed quantity of content is discharged from the second container 20, so as to achieve the expected effects of a simple, quick, convenient and efficient application.

For every time of pressing on the handle 50 once, a fixed quantity of content of the second container 20 is discharged. When the handle 50 is released to elastically extend outward and restore its original position, the content of the first container 10 will be entered into the second container 20 for the resupply. If it is necessary to use the content of the first container 10, the user can control the actual consumption accurately according to the number of times of pressing the handle 50, so as to provided provide a simple, easy, convenient and quick application.

Since the moving blocker 52 installed between the first container 10 and the handle 50 can block the handle 52 and prevent it from being pressed when the first container 10 is filled or the content is not intended to be discharged, therefore when the containing device of the present invention is carried out or handheld, the handle 50 will not be pressed by accident and the content will not be leaked, so as to achieve the effect of a safe use.

Since the lid 30 is tightly installed to the upper end opening 1012 of the first container 10, and the base 102 of the first container 10 seals the release outlet 204 of the second container 20, therefore the invention prevents the contents contained in the first container 10 and the second container 20 from leaking to facilitate user to carry and achieves the expect moisture-proof effect.

When the second lid 40 is used for repackaging or mixing the contents of a special bottle or can b, and the mouth b of the bottle or can is aligned precisely and inserted into the coupling hole 4014 of the second lid 40, the content of the bottle or can B may be guided smoothly into the first container 10, because the positioning pillar ledge 40221 of the blocking member 402 installed to the second lid 40 is protruded from the outer edge of the insert hole 4018 of the main body 401, and t the desiccant bag installed in the packaging bottle or can B can be pushed upward, and the mount b of the bottle or can B will not be blocked. Therefore, the present invention can achieve the quick and smooth repackaging effect.

The positioning pillar 4022 of the blocking member 402 of the second lid 40 is movably passed and installed into the insert hole 4018 of the main body 401, so that when the channel A formed in the blocking plate 4021 is shut, and the guide hole 4015 and the feed guiding hole 4016 of the main body 401 are shut, the content of the first container 10 will not be leaked to the outside easily to achieve the safe and stable storage effect. Even if containing device of the present invention falls accidentally, the blocking plate 4021 seals the channel A, the guide hole 4015, and the feed guiding hole 4016 completely to prevent any leakage.

Besides the capability of repackaging or mixing the powder or particulate substance in a relatively larger packaging bottle, can or bag and the easy-to-carry and convenient-to-use features, the present invention also has the sanitary and safe effects since the containing body 101 and the base 102 of the first container 10, the second container 20, the lid 30, and the second lid 40 may be detached easily for cleaning.

In other words, the invention has the following features and advantages:

1. Simple and easy manufacture, and cost-effective.
2. Simple and convenient operation to improve the performance and efficiency of using the powder or particulate substance.
3. Occupying little space, and convenient to carry.

What is claimed is:

1. A containing device, comprising a first container, a second container and a lid, wherein the first container includes a containing body and a base, and the containing body includes a first containing portion, an opening formed at an upper end of the first containing portion, a first leading-out opening formed at a lower end of the first containing portion and communicated with the base; the base includes a second containing portion, a second leading-out opening formed at a lower end of the second containing portion for open communication therethrough; the second container is movably pivoted in the second containing portion of the base of the first container and displaceable in the second containing portion and includes a receiving groove capable of controlling a fixed unit or quantity, and a top of the receiving groove has a separating board and a leading-in opening, and a release outlet is formed at a lower end of the receiving groove for open communication therethrough, and the separating board and the leading-in opening are corresponsive to the first leading-out opening of the first container, such that the release outlet is corresponsive to the second leading-out opening of the first container or sealed by the base; and the lid is installed at an upper end or a lower end of the first container.

2. The containing device as claimed in claim 1, wherein when the separating board of the second container is corresponsive to the first leading-out opening of the first container, the release outlet is corresponsive to the second leading-out opening of the first container, and when the leading-in opening is corresponsive to the first leading-out opening of the first container, the release outlet is sealed by the base of the first container.

3. The containing device as claimed in claim 1, wherein the containing body and the base of the first container have corresponding installing and removing tenon and mortise respectively.

4. The containing device as claimed in claim 1, further comprising a second lid installed at an upper end or a lower end of the first container, and the second lid including a main body and a blocking member, and the main body including a first sleeve portion and a second sleeve portion, and the first sleeve portion sheathing on and combining with the upper end or the lower end of the first container, and the second sleeve portion being opened outward and having a feed nozzle protruded from a position proximate to the center of the second sleeve portion, and the feed nozzle having an inwardly concave coupling hole, and a guide hole being formed and communicated between the first sleeve portion and the second sleeve portion, a feed guiding hole being formed and communicated between the coupling hole of the feed nozzle and the first sleeve portion, a tenon body protruding outwardly from the coupling hole of the feed nozzle, and an insert hole formed and penetrating through the tenon body, and the blocking member having a blocking plate and a positioning pillar, and the positioning pillar being movably passed and positioned in the insert hole of the main body, such that the blocking plate is situated at the first sleeve portion of the main body, and a ledge being disposed at an outer end of the positioning pillar and protruded from an outer edge of the insert hole of the main body, such that a moving channel is formed between the blocking plate and the bottom of the first sleeve portion of the main body.

5. The containing device as claimed in claim 4, wherein the blocking plate of the blocking member is tilted, such that a moving channel in an upwardly tapered shape is formed.

6. The containing device as claimed in claim 1, wherein when the blocking plate of the blocking member and the first sleeve portion of the main body seal the moving channel, the blocking plate seals the guide hole and the feed guiding hole of the main body.

7. The containing device as claimed in claim 1, further comprising:
   a handle, coupled between the first container and the second container, and having an end movably pivoted to the containing body of the first container and the other end movably pivoted to the second container; and
   an elastic element, coupled between the handle and the first container, for elastically extending the handle outward all the time, so that the second container is displaced altogether in a way that the leading-in opening is corresponsive to the first leading-out opening of the first container, and the release outlet of the second container is sealed by the base of the first container.

8. The containing device as claimed in claim 7, wherein when the handle is pressed inward, the release outlet of the second container is corresponsive to the second leading-out opening of the first container, and the separating board of the second container shuts the first leading-out opening of the first container.

9. The containing device as claimed in claim 7, further comprising a moving blocker coupled between the first container and the handle, and the moving blocker having an end movably pivoted to the containing body of the first container or the handle and the other end freely swinging between the first container and the handle.

* * * * *